(12) United States Patent
Xia

(10) Patent No.: US 6,938,727 B2
(45) Date of Patent: Sep. 6, 2005

(54) INTEGRATED ENGINE COMPARTMENT COMPONENT AND AIR INTAKE SYSTEM

(75) Inventor: Zhouxuan Xia, Windsor (CA)

(73) Assignee: Siemens VDO Automotive Inc., Chatham (CA)

( * ) Notice: Subject to any disclaimer, the term of this patent is extended or adjusted under 35 U.S.C. 154(b) by 0 days.

(21) Appl. No.: 10/453,274

(22) Filed: Jun. 3, 2003

(65) Prior Publication Data

US 2003/0221905 A1 Dec. 4, 2003

Related U.S. Application Data

(60) Provisional application No. 60/385,378, filed on Jun. 3, 2002.

(51) Int. Cl.[7] .............................................. E04F 17/04
(52) U.S. Cl. ...................... 181/224; 181/253; 181/213; 181/233; 181/238; 181/252; 181/282
(58) Field of Search ................................. 181/206–213, 181/232–238, 282, 251–253, 225, 224, 250, 214; 416/189, 119, 169; 123/41.14, 41.49, 41.56; 29/771, 785; 237/79; 293/115; 296/95.1, 91; 92/141; 165/41, 140, 67; 180/68.1, 68.4; 60/226.1

(56) References Cited

U.S. PATENT DOCUMENTS

| | | | | | |
|---|---|---|---|---|---|
| 4,385,549 | A | * | 5/1983 | Bauer et al. ................. | 454/146 |
| 5,620,057 | A | * | 4/1997 | Klemen et al. ............ | 180/68.5 |
| 5,971,062 | A | * | 10/1999 | Sadr et al. ............. | 165/104.32 |
| 6,000,903 | A | * | 12/1999 | Hatch et al. ................ | 414/778 |
| 6,041,744 | A | * | 3/2000 | Oota et al. ............... | 123/41.49 |
| 6,112,514 | A | * | 9/2000 | Burdisso et al. ........... | 60/226.1 |
| 6,155,335 | A | * | 12/2000 | Acre et al. .................... | 165/41 |
| 6,454,527 | B2 | * | 9/2002 | Nishiyama et al. ......... | 415/119 |
| 6,499,956 | B2 | * | 12/2002 | Nakamura .................. | 416/189 |
| 6,523,507 | B2 | * | 2/2003 | Schmitz et al. .......... | 123/41.55 |
| 2002/0189897 | A1 | * | 12/2002 | Trochon ..................... | 181/253 |

* cited by examiner

*Primary Examiner*—David Martin
*Assistant Examiner*—Renata McCloud

(57) ABSTRACT

A fan shroud includes a fan shroud portion having a surface including an aperture. A cooling fan is supported proximate to the aperture for permitting air flow through the fan shroud from the environment to the engine compartment. An air intake portion is supported on the fan shroud portion. The air intake portion and the fan shroud portion together define at least a portion of an air passageway having an inlet for receiving ambient air and an outlet for connection to an engine throttle. The fan shroud portion and air intake portion may respectively include first and second circumferential portions that define the air passageway.

14 Claims, 3 Drawing Sheets

INTEGRATED ENGINE COMPARTMENT COMPONENT AND AIR INTAKE SYSTEM

RELATED APPLICATIONS

This application claims priority to U.S. Provisional Application No. 60/385,378, filed on Jun. 3, 2002.

BACKGROUND OF THE INVENTION

This invention relates to a splash shield and an air intake system, and more particularly, the invention relates to an integrated air intake system and/or fan shroud and/or splash shield, which may incorporate noise cancellation ductwork. Splash shields are typically simple C-shaped plastic structures arranged in each wheel well above the wheels to prevent water and debris from entering the engine compartment. For vehicles having forward located engine compartments, fan shrouds are arranged proximate to the grill. The fan shroud includes an aperture, and a cooling fan is supported proximate to the aperture for cooling the engine.

Vehicle air intake systems route air from the environment to the engine for use in the combustion process. Air intake systems include a tube with an opening, typically located at the front of the vehicle proximate to the radiator, extending to the engine throttle. Various passive or active noise cancellation systems may be connected to the air intake and are located within the engine compartment, which because of their size may be difficult to package within the tight confines of modern engine compartments. Furthermore, increasing demands have been placed upon engine compartment space due to styling considerations and additional vehicle systems components.

Quarter wave tubes and Helmholtz resonators are commonly used to generate noise canceling pressure waves in passenger vehicles. Another type of passive noise cancellation structure is a Herschel-Quincke (HQ) tube, which provides superior noise cancellation to other passive noise cancellation systems. However, HQ tubes cancel noise over a broader frequency band than either quarter wave tubes or Helmholtz resonators. HQ tubes have not been used in passenger vehicle applications because they require a very large amount of space—much more space than is available within the confines of the engine compartment. Therefore, what is needed is a way of incorporating a noise cancellation system, such as an HQ tube, into a passenger vehicle to provide improved noise cancellation and increased space within the engine compartment.

SUMMARY OF THE INVENTION AND ADVANTAGES

The present invention provides a frame and a body that defines an engine compartment. A splash shield and fan shroud may also define the engine compartment. An engine is arranged within the engine compartment. The fan shroud includes a fan shroud portion having a surface including an aperture. A cooling fan is supported proximate to the aperture for permitting air flow through the fan shroud from the environment to the engine compartment. An air intake portion is supported on the fan shroud portion. The air intake portion and the fan shroud portion together define at least a portion of an air passageway having an inlet for receiving ambient air and an outlet for connection to an engine throttle. The fan shroud portion and air intake portion may respectively include first and second circumferential portions that define the air passageway.

Other air passages may be defined in a similar manner and integrated with the fan shroud, splash shield, and/or air intake tube. For example, an active or a passive noise cancellation system, such as a Herschel-Quincke tube arrangement, may be formed by the fan shroud and air intake portions.

The integrated fan shroud, splash shield, and/or air intake tube may be formed by any suitable plastic forming process, such as by blow or injection molding. The engine compartment components such as the fan shroud, splash shield, and air intake portions may be constructed from numerous pieces and secured to one another by a weld bead.

Accordingly, the above invention provides a way of incorporating a noise cancellation system, such as an HQ tube, into a passenger vehicle to provide improved noise cancellation and increased engine compartment space.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
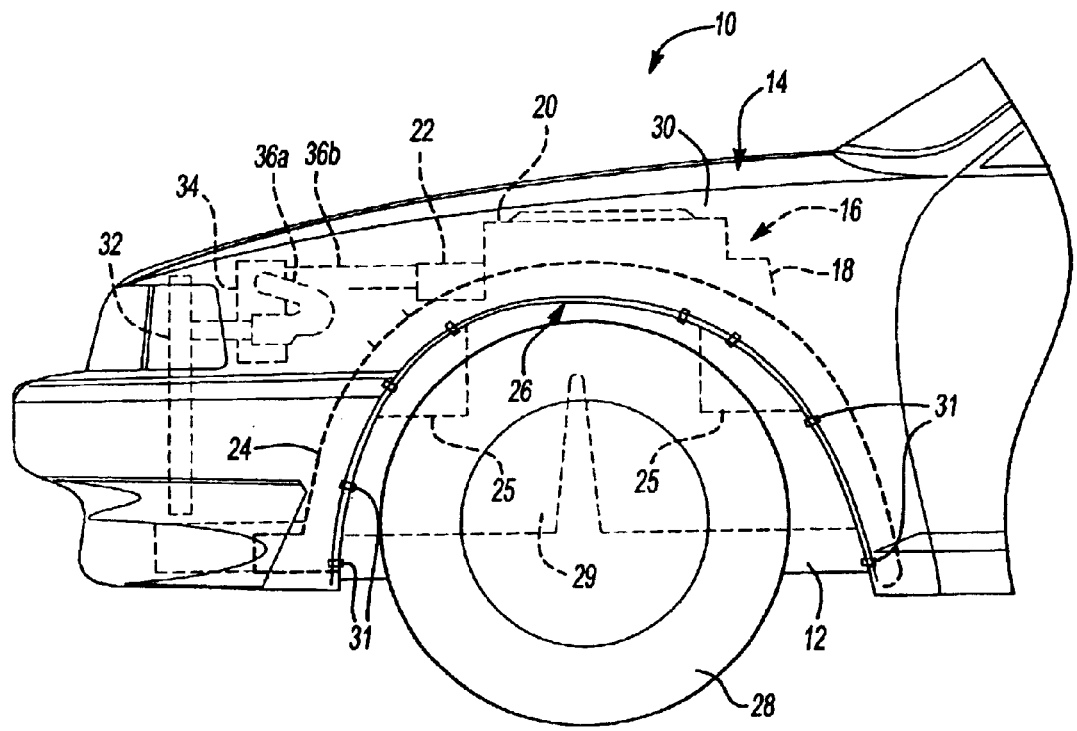
FIG. 1 is a side view of a passenger vehicle incorporating the present invention integrated fan shroud and air intake tube.

A vehicle 10 incorporating the present invention integrated splash shield and air intake tube is shown in FIG. 1. The vehicle 10 includes a frame 12 and a body 14 supported on the frame 12. The frame 12 and body 14 together define an engine compartment 16 at the forward end of the vehicle 10. However, it is to be understood that the present invention may be utilized in a different location, for example, at the rear of the vehicle for rear engine configurations. The vehicle 10 includes an engine 18 having an intake manifold 20 and throttle 22 disposed within the engine compartment 16, as is well known in the art. An air cleaner box 34 may be connected between the present invention fan shroud 32 and the throttle 22 of the engine 18 by tubing 36a and 36b.

A splash shield 24 is arranged between the engine compartment 16 and a body fender 30 to define a wheel well 26. The splash shield 24 is C-shaped and arranged at least partially around a wheel 28 to prevent water and debris from entering the engine compartment 16. The splash shield 24 includes spaced apart downwardly extending flanges 25 that support a rubber flap 29 arranged between the wheel 28 and the engine compartment 16, as is known in the art, to provide a further barrier to water and debris. The fender 30 is secured to the splash shield 24 by fasteners 31 so that the splash shield 24 provides structural support for at least a portion of the fender 30. Components such as the fan shroud 32 and splash shield 24 also define the engine compartment 16.

Figure 2:
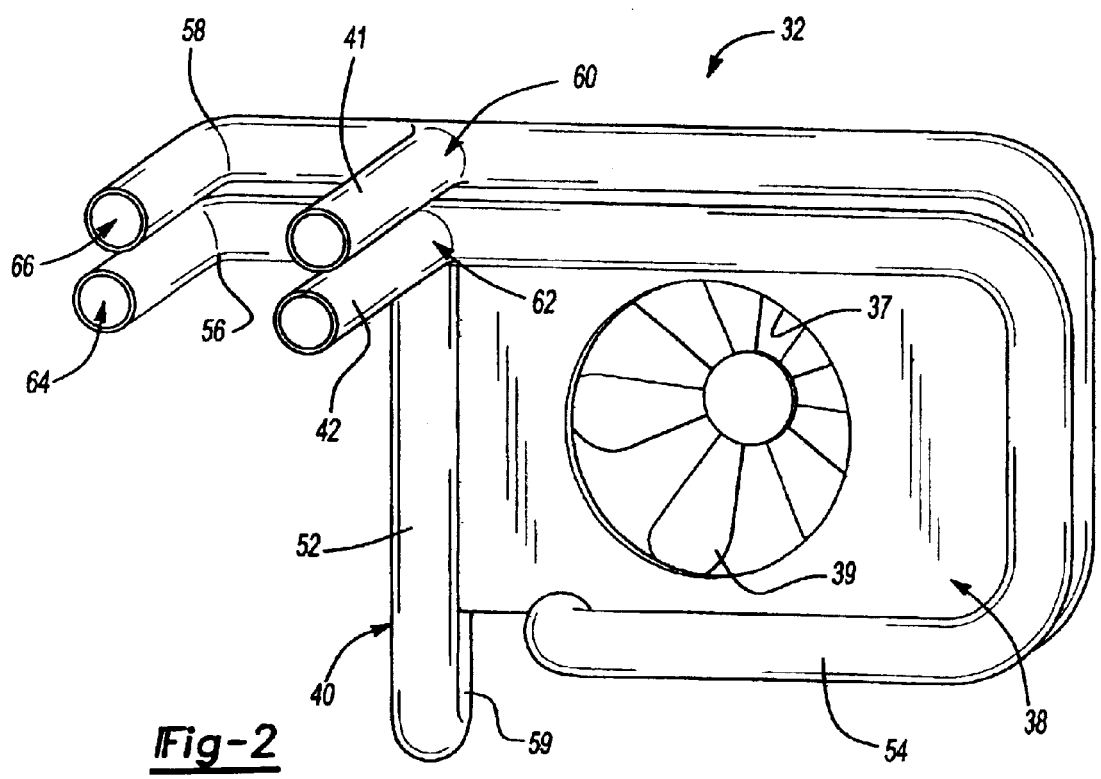
FIG. 2 is a near perspective view of the present invention integrated fan shroud and air intake tube.
Figure 5:
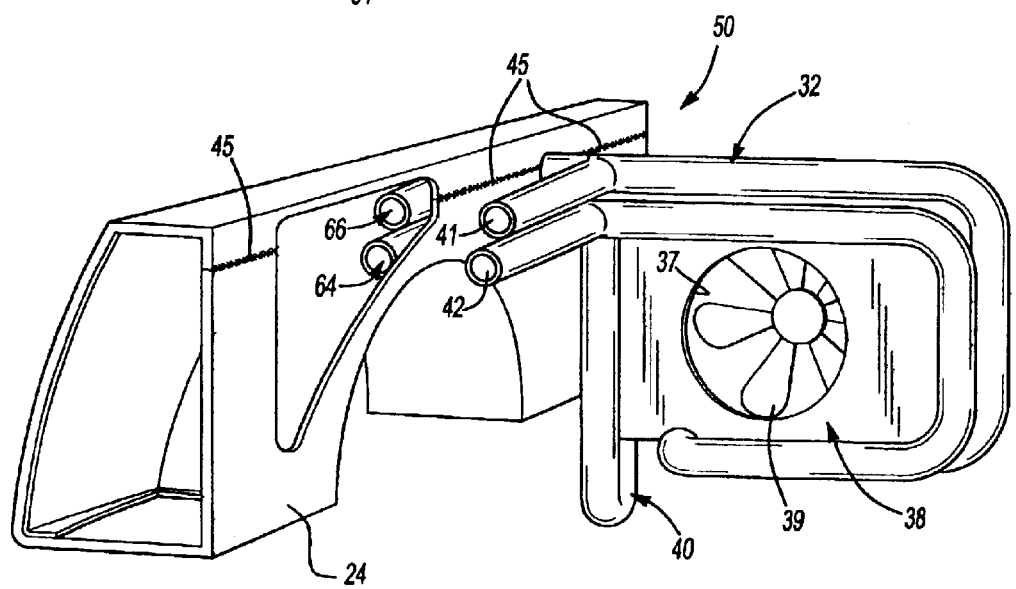
FIG. 5 is a rear perspective view of the air intake tube integrated with the fan shroud and FIG. 2 and a splash shield.

In one example, the invention provides an integrated fan shroud 32 and air intake tube to free up space within the engine compartment 16, as shown in FIG. 2. In another example, shown in FIG. 5, the fan shroud 32, splash shield 24, and air intake tube may be integrated with one another to make more efficient use of the space. One of ordinary skilled in the art will appreciate that the air intake tube may be integrated with the splash shield 24 alone or with another large component defining the engine compartment.

While the present invention is described as incorporating an HQ tube, it is also to be understood that other noise cancellation systems may be incorporated with the splash shield 24 such as quarter wave tubes, or Helmholtz resonators. The present invention splash shield 24 provides the unique ability of incorporating an HQ tube because of the large surface it provides. More particularly, HQ tubes require a considerable length of tubing, which prior to the present invention was difficult to incorporate given the limited space within the engine compartment 16.

Figure 3:
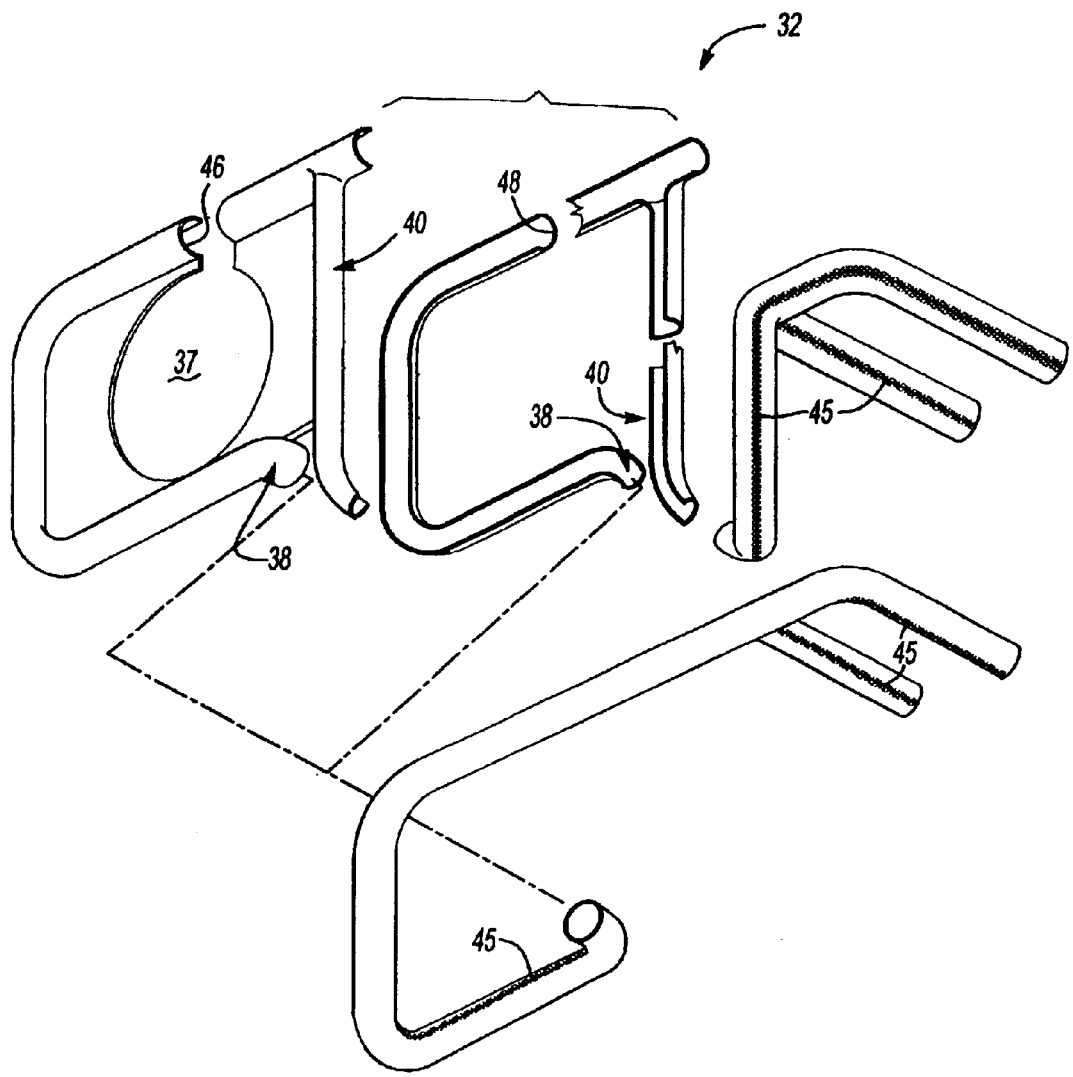
FIG. 3 is a front perspective view of the present invention shown in FIG. 2.

Referring to FIGS. 2 and 3, the fan shroud 32 includes a fan shroud portion 38 and an air intake portion 40 supported on and secured to the fan shroud portion 38, preferably by weld beads 45. The fan shroud portion 38 include a surface defining an aperture 37. A cooling fan 39 is arranged proximate to the aperture 37 for moving air through the engine compartment to cool the engine. Since the air passageway 52 and associated passages formed by the fan shroud portion 38 and air intake portion 40 may be rather complicated, it may be necessary to utilize numerous components secured to one another to define the air passageways. As best shown in FIG. 3, multiple components may be used that define a portion of the passageway, which are then secured to one another by any suitable means such as by weld beads 45. The configuration shown is exemplary. One of ordinary skill will appreciate that the seams and bends shown may be arranged in any number of suitable ways. The fun shroud portion 38 may define a first circumferential portion 46. The air intake portion 40 may define a second circumferential portion 48 that defines an air passage together with the fan shroud portion 38 when secured thereto. Additional tubes may be welded to the air intake portion 40 as part of the integrated fun shroud 32.

Figure 4:
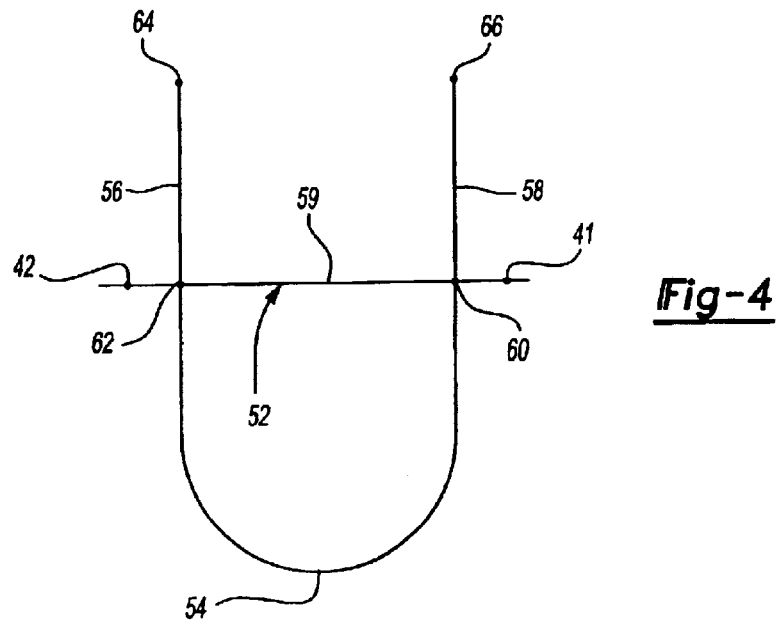
FIG. 4 is a schematic view of an HQ tube for a passive noise cancellation system as shown in the integrated fan shroud and air intake tube depicted in FIGS. 2 and 3.

Referring to FIGS. 2 and 4, an air passageway 52 extends from the inlet 41 from the outlet 42 to provide air from the environment to the engine 18 for the combination process. The inlet 41 has an air passageway extending to an outlet 42 that may be connected to the throttle 22 by other tubing and ductwork. A noise cancellation system 50 may also be incorporated into the present invention fan shroud 32 to take advantage of the space provided by the fan shroud 32 outside of the engine compartment 16. An active or passive noise cancellation system 50 may be fluidly connected to the air passageway 52 and may be at least partially formed by the fan shroud portion 38 and the intake tube portion 40. For example, it is desirable to incorporate an HQ tube to the fan shroud 32 because it provides noise cancellation over a broader range of frequency than that of quarter wave tubes or Helmholtz resonators. HQ tubes have not been incorporated into passenger vehicle applications because of the limited space within the engine compartment 16.

An HQ tube arrangement includes a long passageway that intersects the air passageway 52 extending from the inlet 41 to the outlet 42. More specifically, an HQ tube arrangement includes a first passage 54 intersecting the air passageway 52 at spaced apart nodes 60 and 62. A second passage 56 extends from one node and a third passage 58 extends from the other node. A portion 59 of the air passageway 52 defines a length between the first 60 and second 62 nodes.

A desired noise cancellation frequency is selected for the noise cancellation system. For example, it may be desirable to cancel noise at 90 Hz. Because of the broad frequency of noise cancellation that an HQ tube provides, noise may be cancelled as low as 60 Hz and as high as 120 Hz for a target frequency of 90 Hz. Once the desired noise cancellation frequency has been selected, the lengths of the passages 54, 56, 58, and the portion 59 may be determined. The equation below is used in determining the lengths:

$$\lambda = \frac{c}{f}$$

where
$\lambda$—wave length
c=Speed of sound
f=target frequency

For a typical HQ tube arrangement, the length of the portion 59 is $$\frac{\lambda}{2}$$

and the length of the first passage 54 is $\lambda$ such that the noise cancellation wave within the first passage 54 is 180° out of phase with the pressure wave traveling in the air passage 52. Typically, the lengths of the second and third passages 56 and 58 are $$\frac{\lambda}{4}$$

and respectively terminate at ends 66 and 64 so they act as quarter wave tubes. It should be understood, however, that the lengths of the passages may be revised to fine tune the noise cancellation provided by the HQ tube.

The present invention may be constructed from plastic using any suitable molding process. For example, an injection or blow molding process may be used. One suitable plastic may be a 20% talc filled polypropylene. The plastic pieces are welded together using any suitable process.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A vehicle component comprising:
   a fan shroud portion having a surface including an aperture for accommodating a cooling fan; and
   an air intake portion secured to said fan shroud portion, said air intake portion including a plurality of pieces secured to a wheel well portion, said air intake portion and said fan shroud portion defining at least a portion of an air passageway having an inlet for receiving ambient air and an outlet for connection to an engine throttle wherein air flow through said air passageway is independent of air flow through said aperture in said fan shroud, said fan shroud portion and said air intake portion further defining a noise cancellation conduit portion in fluid communication with said air passaseway for providing noise cancellation, wherein said noise cancellation conduit portion is a Herschel- Quincke tube, wherein said fan shroud portion at least partially defines a first circumferential portion of said air passageway and said Herschel-Quincke tube, and said air intake portion at least partially defines second circumferential portion of said air passageway and said Herschel-Quincke tube, said air intake portion and said wheel well portion defining said Herschel-Quincke tube.

2. The vehicle component according to claim 1, wherein said fan shroud portion and said air intake portion are plastic with a weld bead securing said fan shroud portion and said air intake portion together.

3. The vehicle component according to claim 1, wherein said Herschel-Quincke tube has a first passage with opposing ends fluidly intersecting said air passageway at spaced apart nodes, said Herschel-Quincke tube including second and third passages respectively extending from and in fluid communication with said nodes with said second and third passages terminating in terminal ends.

4. The vehicle component of claim 1 wherein said air passageway extends at least partially about a circumference of said aperture.

5. The vehicle component of claim 1 wherein said surface is at least substantially planar and said aperture defines a cooling air path axially through said fan shroud portion, said air passageway radially spaced from said aperture.

6. The vehicle component of claim 5 wherein said inlet and said outlet are each radially spaced from said aperture.

7. The vehicle component of claim 6 wherein air flow into said inlet is in a direction parallel to and radially spaced from said air flow through said aperture in said fan shroud.

8. The vehicle component of claim 1 wherein said air intake portion defines a first arcuate portion and said fan shroud portion defines a second arcuate portion, said first arcuate portion and said second arcuate portion defining said air passageway.

9. A vehicle comprising:
a fan shroud and a splash shield defining a portion of an engine compartment with an engine disposed in said engine compartment; and
said splash shield having a first portion and a second portion, said first portion and said second portion secured to one another defining an air passageway in fluid communication with said engine.

10. The vehicle according to claim 9, wherein air flow through said air passageway is independent of air flow through a cooling fan aperture in said fan shroud.

11. The vehicle according to claim 10, wherein air flow is through said air passageway to said engine.

12. The vehicle according to claim 9, wherein said first and second portions further define a noise cancellation conduit portion in fluid communication with said air passageway for providing noise cancellations.

13. The vehicle according to claim 12, wherein said noise cancellation conduit portion is fluidly connected to a passive noise cancellation system.

14. The vehicle according to claim 13, wherein said passive noise cancellation system is a Herschel-Quincke tube.

* * * * *